United States Patent [19]

Kataoka et al.

[11] 4,235,507
[45] Nov. 25, 1980

[54] OPTICAL SYSTEM TO CONDENSE LIGHT FROM A SEMICONDUCTOR LASER INTO A CIRCULAR SPOT

[75] Inventors: Keiji Kataoka, Kawagoe; Seiji Yonezawa, Hachioji, both of Japan

[73] Assignee: Hitachi, Ltd., Japan

[21] Appl. No.: 937,982

[22] Filed: Aug. 30, 1978

[30] Foreign Application Priority Data

Sep. 16, 1977 [JP] Japan .................................. 52-111399
Apr. 7, 1978 [JP] Japan .................................. 53-40333

[51] Int. Cl.³ ............................................. G02B 21/00
[52] U.S. Cl. ................................. 350/19; 179/100.3 V
[58] Field of Search ....................... 350/19, 96.3, 18, 8, 350/10; 358/4, 126–128; 354/79.4; 331/94.5 H, 94.5 K; 179/100.32; 219/120, 122, 123

[56] References Cited

U.S. PATENT DOCUMENTS

| | | | |
|---|---|---|---|
| 3,506,329 | 4/1970 | Weaver | 350/10 |
| 3,801,181 | 4/1974 | Kitano et al. | 350/96.3 |
| 3,855,426 | 12/1974 | Bouwhuis | 358/4 |
| 3,855,607 | 12/1974 | Kressel et al. | 331/94.5 H |
| 4,115,809 | 9/1978 | Veno | 358/128 |
| 4,142,209 | 2/1979 | Hedlund et al. | 358/128 |

*Primary Examiner*—John K. Corbin
*Assistant Examiner*—B. Wm. de los Reyes
*Attorney, Agent, or Firm*—Craig & Antonelli

[57] ABSTRACT

An optical system has an objective lens for focussing on a dotted information carrying video disc the light emitted from a light source of semiconductor laser whose radiant region has different longitudinal and lateral dimensions, and a coupling lens disposed between the objective lens and the laser source for condensing the light from the laser source. The coupling lens has a magnification factor of not greater than 7.

6 Claims, 4 Drawing Figures

OPTICAL SYSTEM TO CONDENSE LIGHT FROM A SEMICONDUCTOR LASER INTO A CIRCULAR SPOT

This invention relates to an optical system and more particularly to such a system adapted to reproduce a signal from dotted information recorded on a disc.

Figure 1:
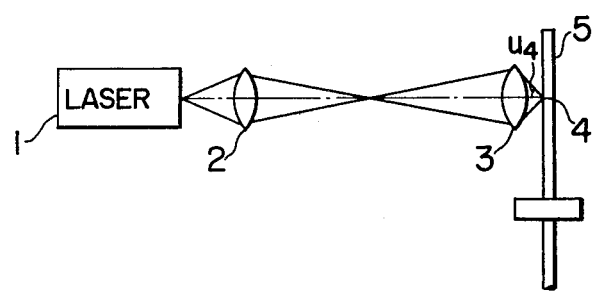
Figure 2:
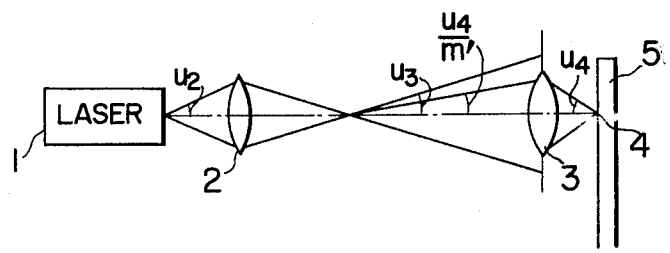
Figure 3:
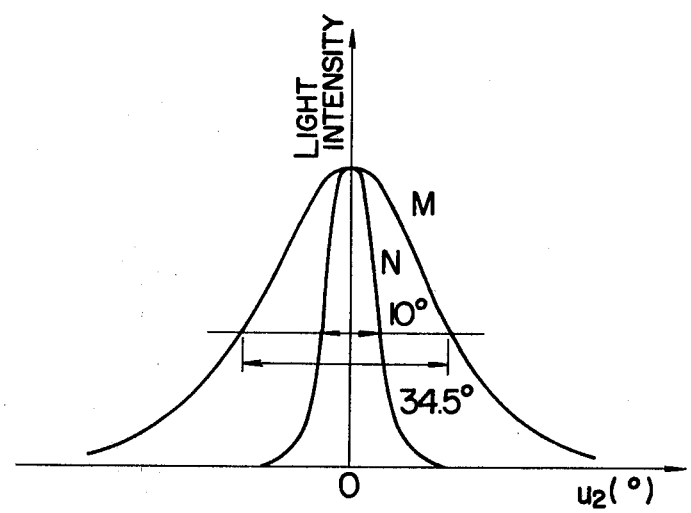
Figure 4:
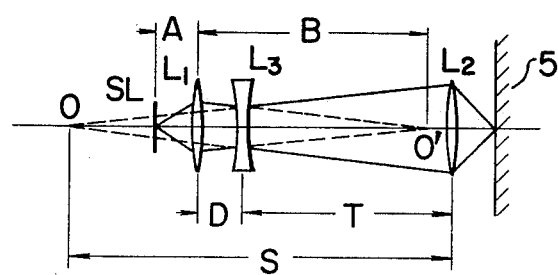

This invention as well as the prior art will be described in conjunction with the accompanying drawings, in which:

FIG. 1 shows schematically a conventional optical system used in a video reproducing apparatus using a semiconductor laser as a light source;

FIG. 2 schematically shows an optical system according to an embodiment of this invention;

FIG. 3 shows the far-field pattern of the light from the semiconductor laser; and FIG. 4 schematically shows an optical system according to another embodiment of this invention.

Each information dot of dotted information recorded on a disc usually has a diameter of 1-2 μm and the information dots are arranged on the disc in the form of a spiral track or concentrically circular tracks.

To accurately reproduce a signal from the dotted information, it is necessary to condense the light from a laser apparatus into a circular spot having a half-width (full width of half maximum) of about 1 μmϕ.

In a conventional video-disc type reproducing apparatus using a semiconductor laser as a light source, the radiant region of the semiconductor laser is usually in the buried-hetero structure having a square configuration of 1 μm × 1 μm. With such a video-disc type reproducing apparatus having an optical system as shown in FIG. 1, a spot of light having a diameter of about 1 μmϕ can be obtained on the disc. In FIG. 1, reference numeral 1 indicates a semiconductor laser as a light source, 2 a first or coupling lens, 3 a second or objective lens (focussing lens), 4 a light spot focussed, and 5 a disc. In this optical system, for example, both the coupling lens 2 and the objective lens 3 has a magnification factor of 25 and a numerical aperture (N.A.) of 0.4. Indeed, the laser having a radiant region of 1 μm × 1 μm can enjoy an advantage that the focussed spot 4 has a circular cross section, but it also has a drawback that the laser output is small due to the small radiant region. The small radiant region necessitates the use of lenses having large magnification factor and N.A. and there arises a drawback that the adjustment of the optical system, especially of the position of the coupling lens, is difficult. Therefore, when it is desired to reproduce a signal from the dotted information, a stable signal having a high signal-to-noise ratio cannot be obtained.

According to the conventional method of obtaining a large laser output, cylindrical lenses are used in a video-disc apparatus using a semiconductor laser with a radiant region of 1 μm in longitudinal dimension and 3-5 μm in lateral dimension, so as to make the spot on the disc approximate to a circular dot. However, such cylindrical lenses are hard to be worked with high precision and therefore expensive. Further, with such cylindrical lenses used, the adjustment of the layout of the optical system is complicated. Moreover, it is difficult to focus the light spot into a circular dot having a diameter of 1 μm since the cylindrical lenses having a large astigmatic aberration are employed.

An object of this invention is to provide an optical system capable of accurately reading a signal out of dotted information recorded on a disc.

According to one aspect of this invention there is provided an optical system comprising a semiconductor laser having a radiant region of different longitudinal and lateral dimensions, an objective lens for focusing the light from said semiconductor laser onto a predetermined recording medium, and a coupling lens interposed between said semiconductor laser and said objective lens for casting the light from said semiconductor laser onto said objective lens to cover the full aperture of said objective lens so that the light cast onto said objective lens is focussed by said objective lens as a circular spot on said recording medium.

According to another aspect of this invention, there is provided an optical system comprising a semiconductor laser having a radiant region of different longitudinal and lateral dimensions, a first lens for focussing the light from said semiconductor laser onto a recording medium having dotted information recorded thereon, a second lens interposed between said semiconductor laser and said first lens for condensing the light from said semiconductor laser, and a third lens interposed between said first and second lenses, the composite magnification factor of said second and third lenses being not greater than 7.

This invention will now be described referring to FIGS. 2 to 4.

Reference should first be had to FIG. 2 showing a first embodiment of this invention. If it is required to cause a light spot 4 focussed onto a disc 5 by means of lenses 2 and 3 to have a half-width of about 1 μm (e.g. about 2.5 μm in the case where the locus of zeros of the brightness of the light diffracted from a circular aperture is regarded as the boundary of the spot), the following relation (1) must be satisfied:

$$1.22\lambda/n' \leq 2.5 \ \mu m \tag{1}$$

Here, λ is the wavelength of the light (equal to 0.83 μm for the semiconductor laser) and n' is the N.A. of the lens 3. Therefore, it follows from the relation (1) that n' ≧ 0.4.

The lens 3 having a N.A. greater than 0.4 usually corresponds to an object lens for use in a microscope, having a magnification factor greater than 20. A lens having large magnification factor and N.A. is shallow in depth of focus so that the fluctuation of the rotation of the disc 5 results in the blur of focus. This prevents the precise reproduction of desired information. Therefore, the lens 3 should preferably have a magnification factor of 20–30 and an N.A. of 0.4–0.5.

There is defined an equation (2) given below between the angle $u_4$ for determining the N.A. shown in FIG. 2 and n'.

$$\sin u_4 = n' \tag{2}$$

Here, in FIG. 2, m' indicates the magnification factor of the lens 3 and n' the N.A. of the lens 3.

For the purpose of sufficiently reducing the size of the focussed spot by the lens 3, it is necessary to cast the light from the semiconductor laser 1 onto the full aperture of the lens 3. For this purpose, the following relation (3) should be satisfied:

$$u_3 \geq (u_4/m') = (\sin^{-1} n')/m' \tag{3}$$

Since m' equals 20–30 and n' equals 0.4–0.5, the minimum value for $u_3$ is 0.0133. The radiation angles $u_2$ and $u_3$ of the light from the semiconductor laser 1 are related to each other by the following equation (4):

$$u_2 = m \cdot u_3 \tag{4}$$

Here, m is the magnification factor of the lens 2. The magnification factor m of the lens 2 is given by the following relation (5) in view of the relation (3) and the equation (4):

$$m \leq u_2/0.0133 \tag{5}$$

FIG. 3 shows characteristics of the light from the semiconductor laser 1 shown in FIG. 2, useful in determining $u_2$ in the relation (5). In FIG. 3, the abscissa represents the radiation angle $u_2$ (in degree) and the ordinate represents the light intensity (in arbitrary unit). FIG. 3 shows, for example, the far-field pattern of the light from a semiconductor laser having a radiant region of about 1 $\mu$m $\times$ 3.5 $\mu$m (longitudinal and lateral dimensions respectively). It is seen from FIG. 3 that the half-width is 34.5° for longitudinal direction (curve M) and 10° for lateral direction (curve N), respectively. Also, for a radiant region of about 1 $\mu$m (longitudinal dimension) $\times$ 5 $\mu$m (lateral dimension), the far-field pattern has for the half-width 34.5° (longitudinal direction) and 7° (lateral direction).

The value of $u_2$ in the above relation (5) is set equal to the angle, i.e. the half-width of the lateral far-field pattern shown in FIG. 3. From this results the following convenience. With the value of $u_2$ determined in the above-described manner, the distribution of the light from the semiconductor laser in either of the longitudinal and lateral directions can be regarded substantially as a circular one within an angle equal to $u_2$, the distribution of light incident to the lens 3 is also circular, and the focussed spot 4 also has a circular shape. The value of $u_2$ in radian is equal to $5 \times \pi/180 \sim 3.5 \times \pi/180$. Here, the value of $u_2$ is determined on the assumption that the lateral dimension of the radiant region of the semiconductor laser 1 ranges from 3.5 $\mu$m to 5 $\mu$m. By taking the largest one of the values for $u_2$, it follows from the relation (5) that $m \leq 6.6$. Therefore, the lens 2 should preferably have a magnification factor smaller than or equal to about 7. The N.A. of the lens 2 must be greater than 0.06 (=sin 3.5°) in view of the smallest value for $u_2$.

If the lens 2 has a magnification factor greater than 7, the spot 4 focussed on the disc 5 is not circular but elliptic.

According to the above-described embodiment of this invention, the light from a semiconductor laser having a radiant region of different longitudinal and lateral dimensions and capable of producing a comparatively large light output can be focussed into a circular spot and therefore a precise reproduction signal can be obtained.

If object lenses for microscope are used as the objective lens and the coupling lens selected as described above, the resultant optical system may sometimes be too long. Namely, the conjugate distance of an objective lens (i.e. the distance from the lens to a conjugate point) is usually 150~200 mm and if two such lenses are set at predetermined positions as a coupling lens and an objective lens, the length of the resultant optical system is 300~400 mm. The use of such an optical system as long as 300~400 mm is not suitable for a photodisc reproduction apparatus and especially disadvantageous from a mechanical point of view in the case of moving the optical system for reproducing the recorded information, i.e. making a rapid access.

The above problem may be eliminated, that is, the length of the optical system may be reduced while the diameter of the focussed spot is kept optimal and the size of the focussed spot is maintained circular. To this end, a concave lens may be interposed between the objective lens and the coupling lens. In that case, however, the simple interposition of the concave lens results in a change of the resultant magnification factor of the system and a change of the distribution of light on the objective lens due to the effect of the concave lens so that the size of the focussed spot and the utilization efficiency of light deviate from their optimal values. Accordingly, the coupling lens cannot be independently selected but with a condition that the composite magnification factor of the objective and concave lenses is less than or equal to 7.

FIG. 4 shows such an optical system as described just above, as another embodiment of this invention. It is apparent from FIG. 4 that the magnification factor $m_3$ of a concave lens $L_3$ is given by the equation $$m_3 = (S-T)/(B-D)$$

where S is the distance from the position O of the virtual image of the light emitting point of a semiconductor laser SL to the position of an objective lens $L_2$, T is the distance between a concave lens $L_3$ and the objective lens, B is the distance between a coupling lens $L_1$ and the real image 0' of the light emitting point of the semiconductor laser SL, and D is the distance between the coupling lens $L_1$ and the concave lens $L_3$. The magnification factor $m_1$ of the coupling lens $L_1$ is as follows:

$$m_1 = B/A$$

Here, A is the distance from the light emitting point of the semiconductor laser SL to the coupling lens $L_1$. Hence, the composite magnification factor m is given as follows:

$$m = m_1 \cdot m_3 = (S-T)/(B-D) \cdot B/A \leq 6.6 \tag{6}$$

It also follows that $$1/(B-D) + 1/(S-T) = -1/f \tag{7}$$

where f is the focal distance of the concave lens $L_3$.

From the relations (6) and (7) are calculated the focal distance and the position of the concave lens to be used for the reduction of the length of the optical system and the magnification factor and the position of the coupling lens.

The length of the optical system can be decreased by decreasing the distance T between the objective lens $L_2$ and the concave lens $L_3$ and the distance D between the concave lens $L_3$ and the coupling lens $L_1$. However, with a practical photodisc reproduction optical system, a voice coil for automatic focussing servomechanism, a galvanometer mirror for tracking, a polarization prism for taking out the signal reflected from the disc, a wavelength plate etc. are disposed between the objective lens and the concave lens so that T is about 80 mm at minimum. The value of D may be as small as about 10 mm.

When object lenses for a microscope are used as the objective and coupling lenses, the values of S and B are both about 180 mm. The magnification factor $m_1$ of the coupling lens $L_1$ in this case is calculated, from the equation (6), as follows:

$$m_1 = B/A = 11.3$$

The focal distance f of the concave lens $L_2$ is also obtained as follows:

$$f = -63$$

The length of the optical system thus obtained is $T+D=90$ mm, which is one fourth of the length $(B+S=360)$ of an optical system using a constitution other than that shown in FIG. 4. The concave lens may be replaced by a selfoc fiber lens which has the same effect as the concave lens, that is, which has its refractive index decreasing with radial distance.

In the embodiment of this invention shown in FIG. 2, the light from the semiconductor laser 1 is converged by the coupling lens and is then cast onto the full aperture of the objective lens. Alternatively, the light radiated from the semiconductor laser is collimated by a coupling lens and the collimated light is cast onto the full aperture of the objective lens.

What we claim is:

1. An optical system comprising a semiconductor laser having a radiant region of different longitudinal and lateral dimensions, an objective lens for focussing the light from said semiconductor laser onto a predetermined recording medium, and a coupling lens interposed between said semiconductor laser and said objective lens for casting the light from said semiconductor laser onto said objective lens to cover the full aperture of said objective lens so that the light cast onto said objective lens is focussed by said objective lens as a circular spot on said recording medium.

2. An optical system as claimed in claim 1, wherein the magnification factor of said coupling lens is not greater than 7.

3. An optical system comprising a semiconductor laser having a radiant region of different longitudinal and lateral dimensions, a first lens for focussing the light from said semiconductor laser onto a recording medium having dotted information recorded thereon, a second lens interposed between said semiconductor laser and said first lens for condensing the light from said semiconductor laser, and a third lens interposed between said first and second lenses, the composite magnification factor of said second and third lenses being not greater than 7.

4. An optical system as claimed in claim 3, wherein each of said first and second lenses is a convex lens and said third lens is a concave lens.

5. An optical system as claimed in claim 3, wherein each of said first and second lenses is a convex lens and said third lens is a selfoc fiber lens.

6. An optical system comprising:
a semiconductor laser emitting an optical output beam, the cross section of which has different longitudinal and lateral dimensions,
an objective lens disposed between said laser and a recording medium; and
a coupling lens intercepting said optical output beam and projecting said optical output beam onto the full aperture of said objective lens;
said objective lens focusing the light projected thereon by said coupling lens onto said recording medium as a circular spot.

* * * * *